United States Patent [19]

Chang

[11] Patent Number: 4,500,454

[45] Date of Patent: Feb. 19, 1985

[54] VEGETABLE PROTEIN EVIDENCING IMPROVED SOLUTION VISCOSITY

[75] Inventor: Pei K. Chang, Montrose, N.Y.

[73] Assignee: Stauffer Chemical Company, Westport, Conn.

[21] Appl. No.: 446,825

[22] Filed: Dec. 3, 1982

[51] Int. Cl.³ .................................................. B23J 1/14
[52] U.S. Cl. ............................ 260/123.5; 260/112 R; 426/656; 426/646
[58] Field of Search ........................ 260/123.5, 112 R; 426/656, 648

[56] References Cited

U.S. PATENT DOCUMENTS

| | | | |
|---|---|---|---|
| 3,637,643 | 1/1972 | Wingerd | 260/123.5 X |
| 3,669,677 | 6/1972 | Sair et al. | 260/123.50 R |
| 3,809,767 | 5/1974 | Sair et al. | 260/123.5 X |
| 4,054,679 | 10/1977 | Melcer et al. | 260/123.5 X |
| 4,364,966 | 12/1982 | Chang | 426/573 |

OTHER PUBLICATIONS

Food Technology, Banwart et al., 10: 68-73.

Primary Examiner—John Kight
Assistant Examiner—Garnette D. Draper
Attorney, Agent, or Firm—Paul J. Juettner

[57] ABSTRACT

A process for increasing the viscosity of vegetable protein-containing solutions which comprises subjecting a substantially dry protein composition containing at least 60% protein which protein is substantially insoluble at its isoelectric point and substantially soluble above and below its isoelectric point to a heat treatment for a period of time sufficient to modify the protein such that the viscosity of a 10% solution of said treated protein composition is increased over a solution of untreated protein composition by at least 100%.

16 Claims, No Drawings

VEGETABLE PROTEIN EVIDENCING IMPROVED SOLUTION VISCOSITY

The present invention relates to vegetable protein and particularly to oil seed proteins evidencing increased solution viscosity and processes for preparing the same.

BACKGROUND OF THE INVENTION

A large amount of oil is expressed from oil seed leaving a solid residue or cake. The cake contains usable protein values and is generally used as is as a supplement to animal feed. The protein values have also been extracted to provide a high protein content material for use in human food. The protein has been used as a protein fortifier additive as well as in some functional capacity. It would be particularly advantageous if the protein could be used as a functional substitute for a higher priced protein such as sodium caseinate.

One of the major oil seed proteins is soy protein. Utilization of large quantities of soy protein has been limited by lack of functionality and increases in functionality could increase the market potential for the protein.

There are also known processes for extracting protein values from various other vegetable sources including grains, seeds and leaves.

It is the intent of the invention to provide processes for improving the functionality of vegetable protein including oil seed protein and particularly for providing protein evidencing increased solution viscosity.

SUMMARY OF THE INVENTION

In accordance with the present invention, it has been found that the viscosity of solutions of vegetable protein and particularly oil seed protein can be increased without substantially decreasing the solubility of the protein by treating a dry vegetable protein and particularly an oil seed protein composition containing at least 50% protein, which protein is substantially insoluble at its isoelectric point and substantially soluble above or below its isoelectric point, to an extended heat treatment at a temperature and for a period of time sufficient to provide the desired increase in viscosity. The heat treatment is easily conducted in a "hot room". Preferably, the heat treatment is conducted for a period of from about 0.5 to about 14 days. The preferred protein is soy bean protein. The protein can also be treated with a protein precipitating compound such as a long chain polyphosphate illustrated by sodium hexametaphosphate or sodium lauryl sulfate. Blends with other proteins such as soy whey protein or dairy whey protein can also be treated in the hot room to achieve improved viscosity. The composition of the invention can be used as a thickener in foods and particularly as a replacement for sodium caseinate.

DETAILED DESCRIPTION OF THE INVENTION

The proteins which can be treated in accordance with the present invention are vegetable proteins which are insoluble at their isoelectric points and soluble above and below their isoelectric points. The preferred vegetable proteins are those proteins described as oil seed proteins which are generally derived from oil seed cake, i.e., that material left after expression of oil from such seeds as cottonseed, palm, peanut, rape, safflower, sesame, soy bean, sunflower and the like. Extractable protein from other vegetable sources such as peas (chick, field, lentil, broad, wrinkled, white and the like), beans (mung, winged, caster, faba, lima, pinto, kidney and the like), grains (wheat, rye, rice and the like, stringbeans and leaves (alfalfa, clover, legume, vegetable and the like) can also be used. The preferred protein is soy bean protein.

The following discussion is directed to the preferred oil seed protein though it equally applies to other vegetable protein sources.

Oil from oil seed is usually extracted from cleaned, decorticated and heated kernels which have been flaked to small size. Continuous screw pressing and hydraulic pressing with or without heat are known methods. The oil can also be extracted using solvents. In this case, the seed cake is usually treated to remove the solvent for recycling in the process such as with steam. These are all standard, well known and documented methods.

The residue or cake from the oil extracting process can be processed as is or dried. The cake is prepared under conditions of manufacture which are suitable for preparing a product for the intended use such as for human consumption. Any procedures for removal of toxic substances such as gossypol from cottonseed meal can be performed at this stage.

The cake or dried form thereof generally having a protein content of less than 55% are treated in accordance with known processes to concentrate the protein such that the dried product has at least 60% and preferably at least 70% protein and more preferably at least 90% protein. These procedures are well known to those skilled in the art. For example, and in connection with the preferred soy bean protein, soy protein concentrate (at least 70% protein—N×6.25 on a moisture free basis) can be prepared by one of three general processes.

In the first, low molecular weight material is extracted with water at about pH 4.5, the average isoelectric point of the major soy bean globulins. The leached material, if neutralized prior to drying, exhibits high solubility of the nitrogen-containing compounds in water.

In the second procedure, sugars are extracted by leaching with 60% to 80% aqueous alcohol. In the third procedure, the protein is denatured by moist heat and then extracted with water. The latter two processes provide products of low solubility of nitrogen-containing compounds in water due to protein denaturation. The material is called a soy protein concentrate and contains from about 60% to about 90% protein and generally from about 68% to about 70%. Soy protein isolate which contains at least about 90% protein can be prepared by extracting the protein with dilute alkali and precipitating the protein at the isoelectric point with acid at about pH 4.5. The curd (precipitate) from this method is usually dispersed in water and neutralized to resolubilize the protein and dried by means normally used for such purpose such as spray drying. The composition to be treated in accordance with the invention must be substantially dry, i.e., having a moisture content of less than about 8% and preferably from about 4% to about 6%.

The method of extraction is not critical and any procedure for extracting protein and forming a dry product of the defined protein with a limited degree of denaturation (less than about 5%) can be used. Extraction procedures which include heating steps which significantly denature the protein as evidenced by an increase in insolubles should be avoided.

The substantially dry protein is then subjected to a heat treatment at from about 50° C. to about 70° C. and preferably from about 62° C. to about 68° C. for a period of time sufficient to modify the protein such that the viscosity of a 10% solution based on total solids of the treated protein composition will be increased over a solution of untreated protein by at least 100% and preferably by at least 500%. The protein to be treated can be treated in a heating chamber such as an oven or in facilities such as that used to pasteurize egg whites which have been described as a hot room. The relative humidity in the heating chamber is preferably maintained at a level up to about 10% relative humidity. While the protein can be treated in an unbagged manner on trays or belts in an oven, the benefit of the process of the invention allows the protein to be treated after it has been bagged so that sanitary conditions can be easily maintained and product, after treatment, is ready for shipment.

The protein is heated for a period of time sufficient to provide a desired percent increase in solution viscosity. Experimental results have indicated that, over the course of heating, solution viscosity can increase and then decrease. The term "increase in solution viscosity" is intended to be determined at the conclusion of the heating treatment for that reason.

The time period for treatment varies with the various proteins being treated, the concentration of the protein and the degree of solution viscosity increase desired. For the preferred soybean protein, treatment times range from about 1 day to about 12 days and preferably from about 3 days to about 6 days.

The product of the invention is prepared under such conditions as to obtain an increase in solution viscosity without an increase in percent insolubles. The rate of increase of insolubles is dependent on the rate of protein denaturation. Excessive temperatures or long term treatment can increase protein denaturation, can cause an increase in denaturation or an increase in the percent insolubles causing a decrease in solubility. By controlling the heating conditions and the heating period, a product with increased solution viscosity without a substantial increase in percent insolubles can be obtained.

The protein heat treated in accordance with the invention can be a single or a blend of vegetable protein(s). Further, up to 50% and preferably from about 5% to about 25% of another protein, preferably a protein which is soluble at its isoelectric point, can also be included. Examples of such protein include dairy whey and soy whey proteins.

Preferably, the protein which is soluble at the isoelectric point of the seed protein and which is termed "whey protein" is soy whey protein. The whey protein can be isolated by known means including ultrafiltration and chemical precipitation such as by the use of sodium hexametaphosphate.

It has also been found that the soy protein, if treated with a polyphosphate during isolation, provides an increase in yield based on total Kjeldahl nitrogen and evidence of increased nutritional values are determined by the pro-byte method. Useful polyphosphates correspond to the following formula:

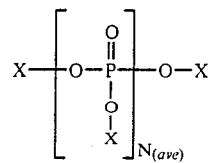

and X which represents individually hydrogen or an alkali metal including ammonium and preferably sodium or potassium, $N_{(ave)}$ represents an average chain length from about 2 to generally not more than about 50. The average chain length as employed herein is intended to represent a statistical average chain length or indication of the number of recurring units linked together comprising the anionic species. Such an average is determined by titration as described in Van Wazer et al., Analytical Anal. Chem. 26, 1755-9 (1954).

Representative compounds include sodium tripolyphosphate and preferably sodium hexamethaphosphate ($N_{(ave)}$ at least 3 and preferably 8-12).

The polyphosphate is added to the protein during isolation prior to the final precipitation at the isoelectric point. In connection with the preferred soy protein, the polyphosphate is preferably combined with the soy flour prior to the separation pH adjustment steps needed to prepare the soy protein concentrate or soy protein isolate. By this means, the soy whey proteins can be isolated simultaneously with the soy proteins. Preferably, the polyphosphate is sodium hexametaphosphate and is used in an amount ranging from about 25% to about 45% based on the weight of the protein in the initial starting material.

The use of blends of diary whey and soy protein are less preferred as the heat treatment can tend to discolor the product due to a browning reaction taking place between the lactose and the protein in the whey. Depending on the quantity of sugar, a brown product could be obtained. Treatment of a blend of whey protein and soy protein with polyphosphate can lower the lactose content by insolubilizing the protein leaving the lactose in the soluble portion.

It has been found that heat treatment of a polyphosphate treated protein demonstrates a reduction in pH. This is theorized to be caused by hydrolysis of the polyphosphate forming orthophosphates.

The compositions of the present invention can be used in a functional manner in any area but particularly in foods. The increased solution viscosity can be effectively utilized as emulsifiers, binders, moisture retainers and stabilizers in various foods such as meat, cheese, imitation cheese, baked goods, soups, gravies and the like. The compositions of the invention can also be used as a replacement for sodium caseinate in imitation cheese, meat, binders, coffee whiteners and the like.

The viscosities in the following Examples are apparent viscosities and were determined using a Brookfield Viscosimeter, Model RVT. The present insolubles were determined by a centrifugation method. Protein is determined by the Kjeldahl method using the appropriate multiplication factor.

The invention will be illustrated in the following Examples:

EXAMPLE 1

Two hot-room treated soy protein samples were prepared as follows, one using a conventional process and the other utilizing sodium hexametaphosphate in the process.

Conventional 4540 grams of soy flour (Staley I-200) was dissolved in 45.6 liters of water. The pH was adjusted to 9.0 with 4 N NaOH and the mixture was held at 35° C. for 45 minutes. The supernatant remaining after centrifugal separation (soy milk) which contained the soy protein was adjusted to pH 4.4 with 4 N HCl. After centrifugation, the curd (a soy isolate) was dispersed in water and the pH adjusted to 7.0. The solution was spray dried and bagged. The protein content of the product (SPI-Conventional) was 86%.

Sodium Hexametaphosphate Process 4540 grams of soy flour (Staley I-200) was dissolved in 45.6 liters of water. 1152 grams of sodium hexametaphosphate (average chain length of 9–12) in 1 gallon of water was added to the soy flour dispersion. The pH was adjusted to 7.0 with 4 N NaOH and held at 35° C. for 45 minutes. After separating the liquid fraction or supernatant which contained a soy extract by centrifugation, the pH of the liquid was adjusted to 3 with 4 N HCl. The soy isolates so precipitated were separated by centrifugation. The precipitate was reslurried in water and the pH adjusted to 7.0. The product was spray dried and bagged. The protein content of the product (SPI-SHMP) was 72%.

50 grams of product prepared by either process was placed in plastic jars and sealed with screw caps. The jars were placed in a 65° C. oven for 2 weeks. Samples were taken at the end of 1 day, 3 days, 6 days and 14 days. The products were tested for pH, percent insolubles, viscosity and gel strength. The following results were obtained:

TABLE I

| Storage Period (Days) | pH SHMP | pH Conv. | % Insolubles SHMP 10% T.S. | % Insolubles Conv. 7.5% T.S. | Viscosity (Cps) SHMP 10% T.S. | Viscosity (Cps) Conv. 7.5% T.S. | Gel Strength, gms. SHMP | Gel Strength, gms. Conv. |
|---|---|---|---|---|---|---|---|---|
| 0 | 6.80 | 6.74 | 2 | 3 | 16 | 25 | 46 | 100 |
| 1 | 5.98 | 6.68 | 37 | 8 | 620 | 50 | 8 | 96 |
| 3 | 5.87 | 6.49 | 42 | 37 | 440 | 203 | 14 | 62 |
| 6 | 5.84 | 6.58 | 62 | 54 | — | 255 | 44 | 64 |
| 14 | 5.78 | 6.56 | 66 | 85 | 32 | 38 | 56 | 84 |

As can be seen from the above data, the soy protein treated in accordance with the invention is characterized by increased solution viscosity over the untreated control. Controlling the time and temperature allows for control of maximum viscosity increase with the minimum increase in percent insolubles. It is particularly surprising that the viscosity of the sodium hexametaphosphate product at 10% total solids can be increased by 16 to 620 centipoises after 1 day of heating with only a 37% total insolubles. The viscosity of the conventional prepared material increases from 25 to 255 after 6 days with only 54% insolubles. The insolubles from the conventional and SHMP processes were gel-like materials.

EXAMPLE 2

Disperse 135 kilograms of soy flour (Staley I-200) in 1368 liters of water. After adjusting the pH to 9.0 using 4 N NaOH, the mixture was held at 35° C. for 45 minutes. The solids were separated in a centrifugal clarifier, the supernatant being a soy milk. The pH of the supernatant was adjusted to the isoelectric point of soy (4.4) with 4 N HCl and the curd was allowed to settle overnight. The supernatant (soy whey) was siphoned off and the remaining material was reslurried in an equal amount of water. The precipitated soy isolate (curd) was separated by centrifugal clarification.

A portion (about ⅓) of the soy isolate was dispersed in water to 10% total solids, the pH was adjusted to 7.0 with 4 N NaOH and the solution spray dried to provide a soy protein isolate, termed SPI-conventional. This product contained 90% protein.

A second portion (about ⅓) was dispersed in water to 10% total solids. To this dispersion was added a soy whey solution prepared as follows:

A portion (about ⅓) of the soy whey was admixed with about 5.26 grams of sodium hexametaphosphate per liter (approximately 0.5% w/v). The pH was adjusted to pH 3.0. The precipitate was separated by centrifugal clarification and the supernatant discarded. The solids were dispersed in water to 10% total solids.

The pH of the combined dispersions was adjusted to 7.5 and the resulting solution was spray dried to provide a soy protein isolate/soy whey-sodium hexametaphosphate blend termed SPI/soy whey-SHMP. This product contained 82% protein.

EXAMPLE 3

90 kilograms of soy flour* were dispersed in 988 liters of water containing 19.8 kilograms of sodium hexametaphosphate. The pH was adjusted to 7.0 with 4 N NaOH and the solution held at 35° C. for 45 minutes. The supernatant obtained by centrifugal clarification was adjusted to pH 3.0 with 4 N HCl and the curd was allowed to settle overnight. The supernatant (soy whey) was siphoned off and the remaining material was reslurried in an equal amount of water. The soy isolate (curd) was separated by centrifugal clarification.

A portion of the soy isolate (about ½) was dispersed in water to about 10% total solids. After adjusting the pH to 7.5 with 4 N NaOH, the solution was spray dried to provide a soy protein isolate modified with sodium hexametaphosphate, termed SPI-SHMP. This product contained 86.5% protein.

*Staley I-200

EXAMPLE 4

Products from Examples 2 and 3 were placed in plastic containers which were sealed with a screw lid. The containers were placed in a 65° C. oven and sampled after various periods of treatment. Viscosity and percent insolubles were determined with the following results:

TABLE II

| Sample | Storage (Days) at 65° C. | Viscosity (Cps) (10% T.S.) | % Insoluble |
| --- | --- | --- | --- |
| SPI-Conventional | 0 | 28 | 0.85 |
|  | 3 | 870 | 0.92 |
|  | 4 | 1390 | 0.27 |
|  | 5 | 1820 | 0.04 |
| SPI-SHMP | 0 | 25 | 7.77* |
|  | 1 | 33 | 5.51* |
|  | 2 | 73 | 0.52 |
|  | 3 | 132 | 1.34 |
| SPI/Soy Whey-SHMP | 0 | 27 | 2.17 |
|  | 3 | 213 | 0.19 |
|  | 4 | 548 | 0.66 |
|  | 5 | 500 | 0.56 |

*Gel-like material

As can be seen from the preceding data, the viscosity of the soy isolate solution can be significantly increased without a decrease in solubility. The most pronounced effect on viscosity was obtained using the conventional soy protein isolate.

EXAMPLE 5

Another sample of SPI Conventional prepared as in Example 2 was treated in a 65° C. oven as outlined hereinbefore.

TABLE III

| Storage Period Days | Viscosity** (Cps) | WAC* % | Insolubles % |
| --- | --- | --- | --- |
| 0 | 23 | 141 | 0.149 |
| 3 | 44 | 151 | 0 |
| 6 | 672 | — | 4.143 |
| 12 | 816 | 170 | 33.516 |
| Caseinate Control | 50 | 268 |  |

*Water absorption capacity
**10% total solids

It is noted that the optimum results comparing viscosity increase against solubility appears to be between 3 and 6 days.

EXAMPLE 6

Non-specific meat loaves were prepared from the following formulation:

|  | Formulation | |
| --- | --- | --- |
|  | Invention (gms) | Control (gms) |
| Ground Chuck | 328 | 328 |
| Water | 66 | 66 |
| Salt | 6 | 6 |
| Binder | 12 | — |

Meat, sufficient for testing, was mixed in a Hobart mixer at speed No. 1 for 1-2 minutes. Several 328 gram samples were weighed out. The meat samples were refrigerated at 10° C. Salt, water and, if present, binder were admixed with the meat samples and blended for 30 seconds in a food processor (Cuisinart). After scraping, the meat was blended another 30 seconds. Three 100 gram samples were placed in 250 milliliter beakers and covered with foil. The samples were refrigerated for 3 hours and cooked in an 80° C. water bath for 40 minutes. After cooling for 30 minutes the juice was poured off and the final yield obtained. The following results were obtained:

TABLE IV

| Binder | % Yield* |
| --- | --- |
| SPI-Conventional (Example 1) | |
| A. Untreated | 66.4 |
| B. Oven Treated (65° C. for 3 days) | 70.2 |
| SPI-SHMP (Example 1) | |
| A. Untreated | 66.9 |
| B. Oven Treated (65° C. for 1 day) | 71.8 |
| Controls | |
| No Binder | 65.2 |
| Sodium Caseinate | 74.4 |

*(Weight after cooking/weight before cooking) × 100

What is claimed is:

1. A process for treating vegetable protein which comprises subjecting a substantially dry protein composition wherein the moisture content of the composition is less than 8% and which composition contains at least 60% protein which is substantially insoluble at its isoelectric point and substantially soluble above and below its isoelectric point to a heat treatment at a level of up to about 10% relative humidity for a period of time sufficient to modify the protein, said period of time being at least 0.5 days, such that the viscosity of a 10% solution of said treated protein composition is increased over a solution of untreated protein composition by at least 100%.

2. The process as recited in claim 1 wherein said protein is an oil seed protein.

3. The process as recited in claim 2 wherein said oil seed protein is selected from the group consisting of cottonseed, sesame, safflower, sunflower, palm, rape, soy bean, peanut and mixtures thereof.

4. The process as recited in claim 2 wherein said oil seed protein is soy bean protein.

5. The process as recited in claim 1 wherein the treating temperature ranges from about 50° C. to about 70° C.

6. The process as recited in claim 1 wherein the treating temperature ranges from about 62° C. to about 68° C.

7. The process as recited in claim 1 wherein the time period for treatment ranges from about 0.5 day to about 14 days.

8. The process as recited in claim 1 wherein said protein composition contains at least 70% protein.

9. The process as recited in claim 2 wherein said protein composition is prepared by extracting the oil seed protein from an oil seed residue remaining after extraction of oil having less than about 55% protein and precipitating the protein at the isoelectric point thereof.

10. The process as recited in claim 1 wherein the vegetable protein is extracted from a vegetable source in the presence of from about 25% to about 45% of an alkali metal polyphosphate based on the protein content of the source.

11. The process as recited in claim 10 wherein said alkali metal polyphosphate is sodium hexametaphosphate.

12. The process as recited in claim 1 wherein said protein composition also includes from about 5% to about 25% of a second protein soluble at its isoelectric point.

13. The process as recited in claim 12 wherein said second protein is whey protein.

14. The process as recited in claim 13 wherein the second protein is precipitated by an alkali metal polyphosphate.

15. The process as recited in claim 14 wherein said alkali metal polyphosphate is sodium hexametaphosphate.

16. The process as recited in claim 14 wherein said second protein is soy bean whey protein.

* * * * *